US012789605B2

(12) United States Patent
Cao et al.

(10) Patent No.: US 12,789,605 B2
(45) Date of Patent: Nov. 10, 2026

(54) VEHICLE SEALING JUNCTION

(71) Applicant: FCA US LLC, Auburn Hills, MI (US)

(72) Inventors: Chengcheng Cao, Shanghai (CN); Chunmei Fan, Shanghai (CN); Ziaoming Chen, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 367 days.

(21) Appl. No.: 18/526,348

(22) Filed: Dec. 1, 2023

(65) Prior Publication Data

US 2025/0180119 A1 Jun. 5, 2025

(51) Int. Cl.
*B60J 10/23* (2016.01)
*B60J 10/25* (2016.01)

(52) U.S. Cl.
CPC ............... *B60J 10/23* (2016.02); *B60J 10/25* (2016.02)

(58) Field of Classification Search
CPC ............. B60J 10/00; B60J 10/23; B60J 10/25
USPC .......................................................... 296/213
See application file for complete search history.

(56) References Cited

U.S. PATENT DOCUMENTS

| | | | | |
|---|---|---|---|---|
| 6,578,909 | B1 * | 6/2003 | Reed | B62D 25/04 296/210 |
| 6,854,784 | B2 | 2/2005 | Kagawa et al. | |
| 2004/0212222 | A1 * | 10/2004 | Katsuma | B62D 25/06 296/203.03 |
| 2005/0116509 | A1 * | 6/2005 | Ido | B62D 25/06 296/210 |

FOREIGN PATENT DOCUMENTS

| | | | |
|---|---|---|---|
| CN | 203472724 U | | 3/2014 |
| CN | 207955796 U | | 10/2018 |
| CN | 108032907 B | | 3/2021 |
| DE | 102004058761 B4 | | 4/2008 |
| DE | 602004011821 T2 | | 2/2009 |
| FR | 2594780 A1 | | 8/1987 |
| JP | 2000247259 A | * | 9/2000 |

OTHER PUBLICATIONS

Yoshihide et al., Japanese Pat. No. JP 2000247259 A. English translation dated 2025. (Year: 2000).*

* cited by examiner

*Primary Examiner* — Caroline N Butcher
(74) *Attorney, Agent, or Firm* — Jeremy J. Klobucar

(57) ABSTRACT

A vehicle sealing junction has a roof panel, a body panel and a frame. The roof panel has a terminal end directed toward the body panel with an apex on the end extending toward an arcuate portion of the body panel. The body panel includes a gutter flange extending toward the roof panel end. The gutter flange is positioned under the roof panel end. The frame provides a securement surface for the gutter flange.

12 Claims, 2 Drawing Sheets

VEHICLE SEALING JUNCTION

FIELD

The present disclosure relates to vehicles and, more particularly, to a sealing junction between the roof panel, body panel and frame gutter.

BACKGROUND

This section provides background information related to the present disclosure which is not necessarily prior art.

In automotive vehicles, a junction is formed between a roof panel, body panel and the frame that provides a roof gutter portion of the vehicle cage frame. The connecting of these three parts creates a gap between the roof panel, body panel and the frame gutter. The gap is relatively large and extends across the width of the vehicle roof. The roof panel is welded with the body panel and the frame gutter so that the gap or channel exists between the component. This gap creates a waterproof failure risk due to the large size of the gap. Thus, it would be desirable to lower the risk of the waterproof failure at the metal junction and to reduce the manpower required to repair the failure if it occurs.

According to the present disclosure, it would be desirable to reduce the size of the gap between the roof panel, body panel and frame gutter. It is desirable to reduce the gap size by reducing the Z or height direction between the components to reduce the gap. Accordingly, the present disclosure overcomes the deficiencies of the existing art.

SUMMARY

This section provides a general summary of the disclosure, and is not a comprehensive disclosure of its full scope or all of its features.

According to an aspect of the disclosure, a vehicle sealing junction comprises a roof panel, a body panel and a frame. The roof panel has a terminal end directed toward the body panel with an apex on the end extending toward a radius portion of the body panel. The body panel includes a gutter flange extending toward the roof panel end so that the gutter flange is positioned under the roof panel end. The frame includes a support and securement surface for the gutter flange. A gap is formed between the roof panel end, body panel end and gutter flange. The roof panel end forms a flange with a length greater than or equal to 5.5 mm. The gutter flange has a length greater than or equal to 6.0 mm. The roof panel is secured to the body by welding or the like. A distance from a roof radius to the frame is less than 3 mm. Also, a distance from the body panel to the frame is less than 2.6 mm.

According to a second aspect of the disclosure, a vehicle comprises a roof panel, a body panel and a frame. The roof panel has a terminal end directed toward the body panel with an apex on the end extending toward a radius portion of the body panel. The body panel includes a gutter flange extending toward the roof panel end so that the gutter flange is positioned underneath the roof panel end. The frame includes a support and securement surface for the gutter flange. A gap is formed between the roof panel end, body panel end and gutter flange. The roof panel end forms a flange with a length greater than or equal to 5.5 mm. The gutter flange has a length greater than or equal to 6.0 mm. The roof panel is secured to the body by welding or the like.

A distance from a roof radius to the frame is less than 3 mm. Also, a distance from the body panel to the frame is less than 2.6 mm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
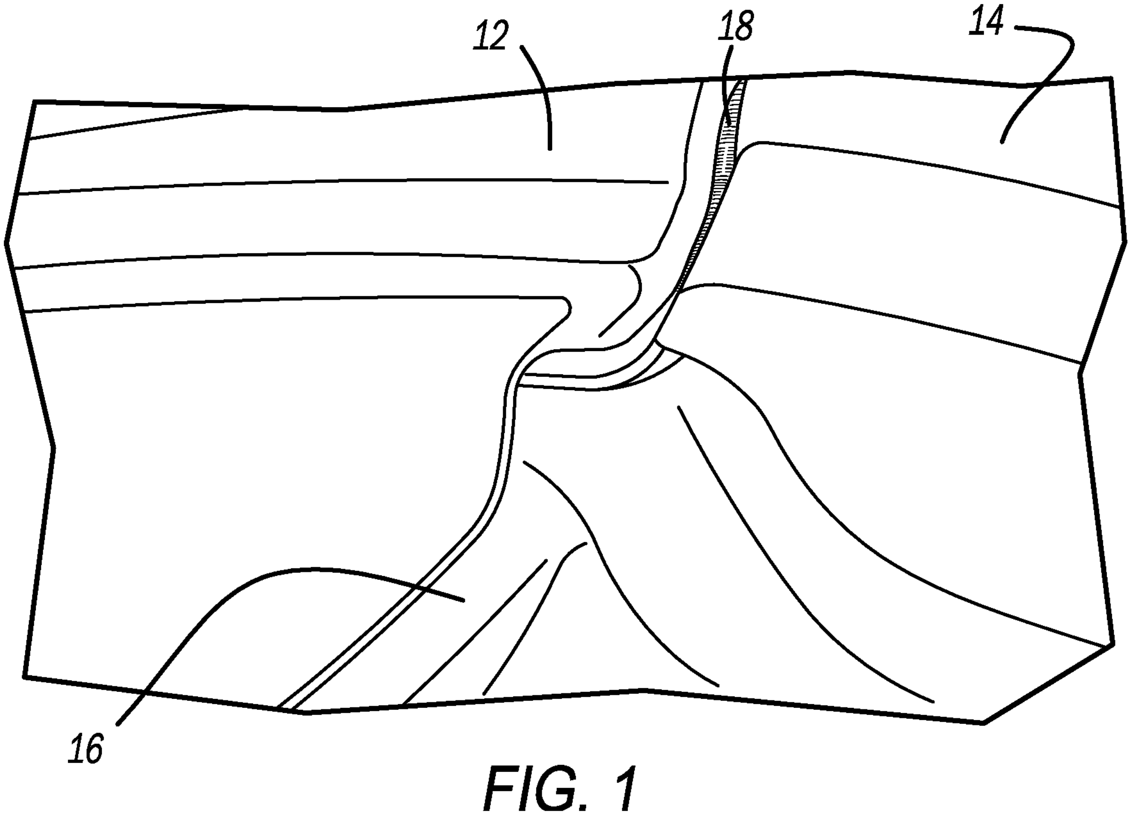
FIG. 1 is a perspective schematic view of a sealing juncture.
Figure 2:
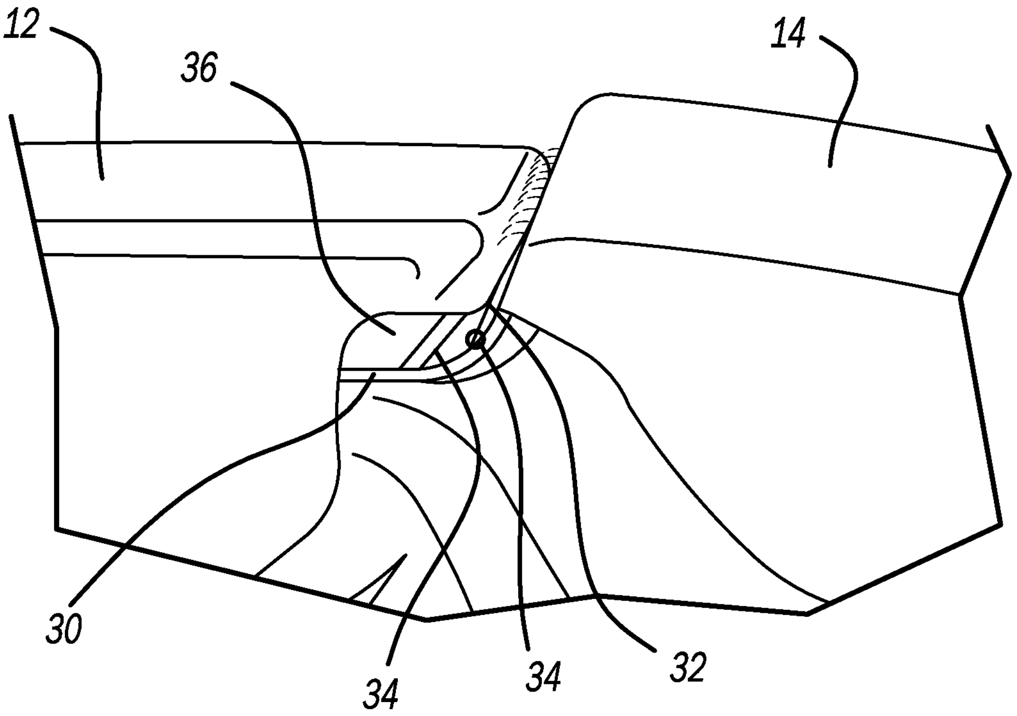
FIG. 2 is a plan view of the sealing juncture.
Figure 3:
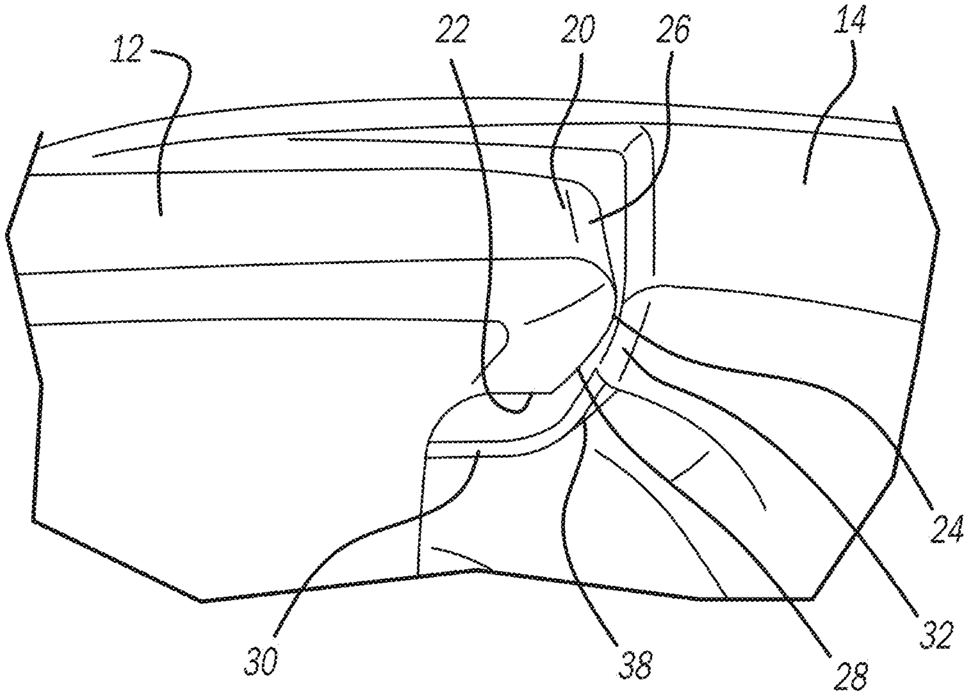
FIG. 3 is a side elevation view of the sealing juncture.
Figure 4:
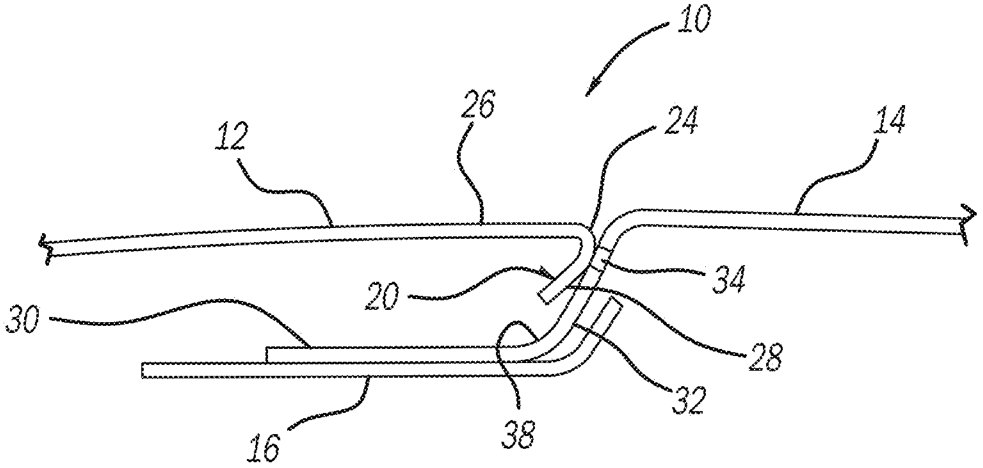
FIG. 4 is a cross section view along line 4-4 of FIG. 1.

Example embodiments will now be described more fully with reference to the accompanying drawings.

Turning to the figures, a junction between sheet metal parts is illustrated and designated with the reference numeral 10. The junction 10 of the parts includes a roof panel 12, a body panel 14 and a frame portion 16. The frame portion 16 is a roof support of the cab frame and more particularly of the roof beam and side beam of the cab frame. The cab frame or carriage provides a skeletal body for the connection of the sheet metal parts like the roof 12 and the body 14 to the frame.

The junction 10 is formed from the roof panel 12, the body panel 14 and the frame portion 16. The roof panel 12 is secured to the body panel 14 by welding or the like. Likewise, the roof panel 12 and body panel 14 are welded or the like to the frame portion 16.

At the junction 10, the end 20 of the roof panel 12 is adjacent to the body panel 14. The roof panel 12 includes a flange portion 22 that forms the end 20 of the roof panel 12. The end 20 includes an apex 24 that is positioned between a top end surface 26 and a bottom end surface 28. The bottom end surface 28 provides a radius portion for the flange 22. Thus, the apex 24 is the furthest projecting point of the roof panel 12 extending toward the radius arcuate portion 38 of the body panel 14. The apex 24 generally is rounded. The apex 24 provides a seat for the weld 18 between the roof panel 12 and body panel 16. The flange 22 extends from the roof panel a length L greater than or equal to 5.5 mm. Also, the body of the flange 22 is positioned about less than 3 mm from the frame portion 16.

The body panel 14 includes a flange 30 extending from an end 32 of the body panel 14. The flange 30 departs from an arcuate portion 38 or the body panel defined by a radius of greater than or equal to 4 mm. Also, the flange 30 extends underneath the roof flange portion 22 or end 20 at a desired distance having a length greater than or equal to 6 mm. Thus, the flange 30, or gutter flange, is positioned underneath the end 20 of the roof panel 12. Also, the flange 30 includes an aperture 34 to enable the exit of air that may be caught in the gap 36. The body panel flange 30 is positioned at a distance of about 2.6 mm or less from the frame portion 16.

The frame portion 16 provides a securement surface and support for the gutter flange 30. The frame surface provides a welding surface for the body gutter flange 30 as can be seen in the figures.

Accordingly, the weld 18 is aligned along the roof panel 12 and body panel 14 across the top or roof of the vehicle. This provides a securement of the roof panel 12 with the body panel 14. Also, due to the flange gutter 30 and the roof panel flange 22, a smaller gap 36 is formed between the roof panel 12, body panel 14 and the frame portion 16. This enables the junction 10 to be sealed with less sealant and provide for a gap that is readily sealed during the manufacturing of the vehicle. Accordingly, the gap 36 can be formed smaller than that of current vehicles to provide better sealing for the vehicle. Thus, the disclosure provides a lower risk of waterproof failure at the metal sheet junctions. Further, if repair is necessary, this substantially reduces the manpower to repair the sealing failure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle sealing junction comprising:

a roof panel, a body panel, and a frame;

the roof panel having a terminal end directed toward the body panel that defines an apex that extends toward an arcuate portion of the body panel;

wherein the terminal end terminates at a free end that is unsecured to either the body panel or the frame;

the body panel includes a gutter flange extending toward the terminal end of the roof panel, the gutter flange includes an aperture to enable an exit of air from between the roof panel and the body panel; and the frame provides a securement surface for the gutter flange.

2. The vehicle sealing junction of claim 1, wherein the terminal end acts as a flange having a length greater than or equal to 5.5 mm.

3. The vehicle sealing junction of claim 1, wherein the gutter flange has a length greater than or equal to 6.0 mm.

4. The vehicle sealing junction of claim 1, wherein the roof panel is secured to the body panel.

5. The vehicle sealing junction of claim 1, wherein a distance from a roof radius to the frame is less than 3 mm.

6. The vehicle sealing junction of claim 1, wherein a distance from the body panel to the frame is less than 2.6 mm.

7. A vehicle comprising:

a roof panel, a body panel, and a frame;

the roof panel having a terminal end directed toward the body panel that defines an apex that extends toward an arcuate portion of the body panel;

wherein the terminal end includes a free end that is unsecured to either the body panel or the frame;

the body panel includes a gutter flange extending toward the terminal end of the roof panel, the gutter flange includes an aperture to enable an exit of air from between the roof panel and the body panel; and the frame provides a securement surface for the gutter flange.

8. The vehicle of claim 7, wherein the terminal end acts as a flange having a length greater than or equal to 5.5 mm.

9. The vehicle of claim 7, wherein the gutter flange has a length greater than or equal to 6.0 mm.

10. The vehicle of claim 7, wherein the roof panel is secured to the body panel.

11. The vehicle of claim 7, wherein a distance from a roof radius to the frame is less than 3 mm.

12. The vehicle of claim 7, wherein a distance from the body panel to the frame is less than 2.6 mm.

* * * * *